Nov. 30, 1971     O. MAAS     3,623,340
RESILIENT SEALING BOOTS FOR UNIVERSAL JOINTS
Filed Nov. 17, 1969
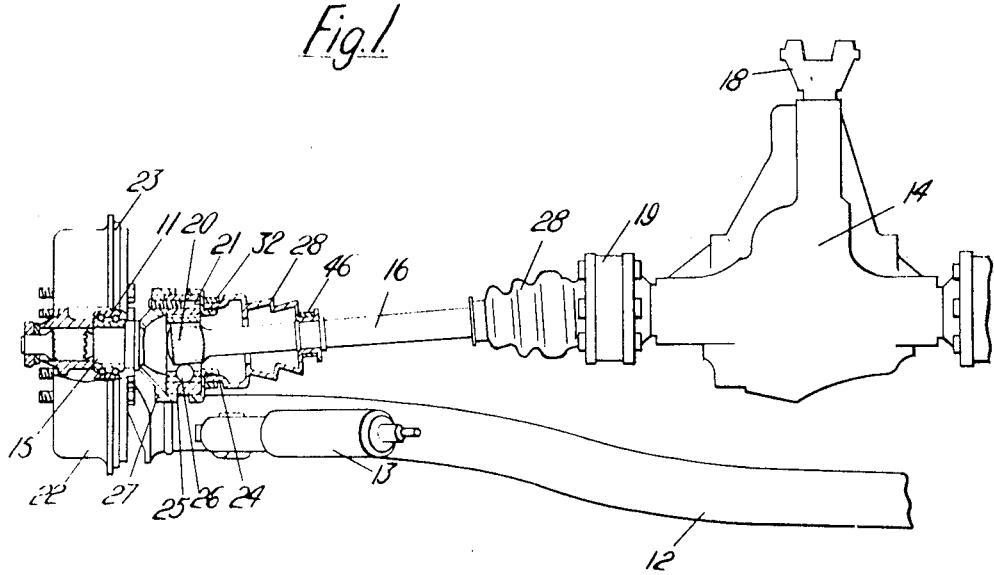
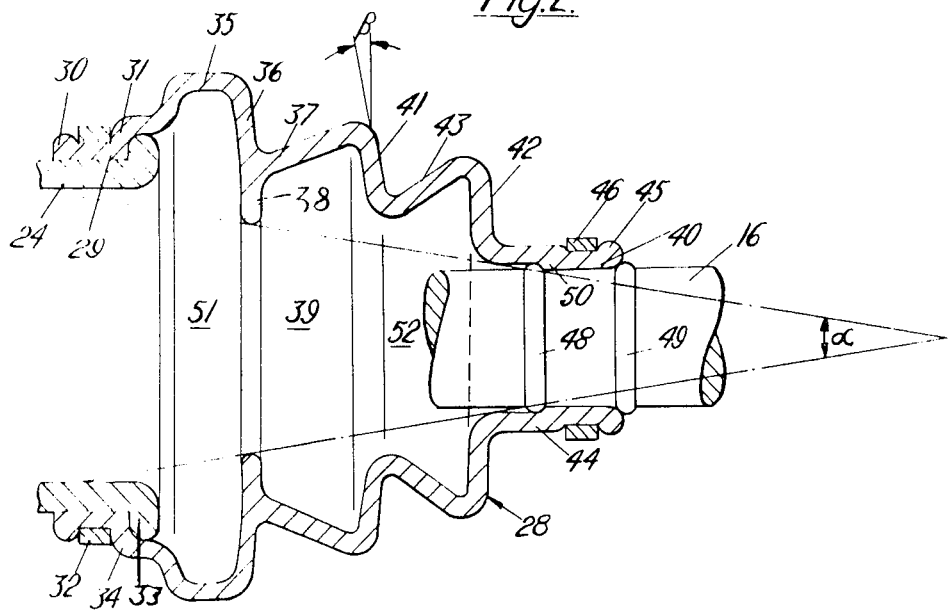
Inventor
Otto Maas
BY Herbert Furman
Attorney United States Patent Office 3,623,340
Patented Nov. 30, 1971

3,623,340
RESILIENT SEALING BOOTS FOR
UNIVERSAL JOINTS
Otto Maas, Russelsheim am Main, Germany, assignor to
General Motors Corporation, Detroit, Mich.
Filed Nov. 17, 1969, Ser. No. 877,159
Claims priority, application Germany, Nov. 30, 1968,
G 68 09 359
Int. Cl. F16d 3/84
U.S. Cl. 64—32
1 Claim

ABSTRACT OF THE DISCLOSURE

A resilient sealing boot for a universal joint in a motor vehicle drive line has at least two interconnected annular diaphragm portions forming a bellows portion of the boot, and one of these annular diaphragm portions adjacent one end of the boot has on its inner periphery an inwardly directed extension which stiffens the bellows to withstand centrifugal forces acting thereon when the joint is rotated. The extension also divides the bellows portion into two interconnected chambers and serves to retain lubricant in one of the chambers.

---

This invention relates to resilient sealing boots for universal joints, such as may be used in motor vehicle drive lines.

It is known to have a resilient sealing boot for a universal joint, which boot has two end portions for securement on respective parts of the joint, and a bellows portion disposed between the two end portions, which bellows can flex to accommodate articulatory movement of the joint. Such a boot may have an inwardly directed flange projecting into the interior of the boot into engagement with a part of the joint to assist in locating the boot on the joint and to assist in securing the boot on the joint. In such a boot the bellows portion may be formed by interconnected diaphragm portions disposed radially of a longitudinal axis of the boot. However, such a boot has little resistance to deformation when the joint is rotated rapidly, and as a result, the bellows become deformed and worn and the useful life of the boot is considerably shortened. This deformation may be increased by the weight of lubricant carried within the bellows.

By the invention there is provided a resilient sealing boot for a universal joint in which the bellows portion is stiffened to withstand centrifugal forces acting thereon when the joint is rotated, and the bellows is so formed that a less quantity of lubricant is required for the joint, so reducing the loading on the bellows and thus assisting in prolonging the useful life of the boot.

The appended claim define the scope of the monopoly claimed. The invention and how it can be performed are hereinafter particularly described with reference to the accompanying drawing in which:

FIG. 1 is a plan, partly in section, of part of a motor vehicle rear axle assembly having universal joints with resilient sealing boots according to the invention; and FIG. 2 is a sectioned elevation, to a large scale, of a resilient sealing boot according to the invention.

In the following specific description reference is made to a motor vehicle rear axle assembly, however the left hand side only of this assembly is shown in FIG. 1 of the drawing as the right hand side of the assembly is in exact correspondence therewith. Hub supports 11 for a transverse pair of wheels (not shown) are fixedly interconnected by an axle support tube 12. A pair of telescopic shock absorbers 13 is mounted on the axle support tube, one shock absorber adjacent each hub support 11. The shock absorbers connect the axle support tube 12 with a body portion (not shown) of the vehicle (not shown) and form part of a suspension system of the vehicle. The suspension system could for example include a pair of forwardly directed control arms, one arm on each side of the vehicle, and a central rearwardly directed control arm, which arms connect the axle support tube 12 to the vehicle body. Since this exemplary suspension system forms no part of the disclosure of this invention it is not described further nor is it illustrated in the drawing. A differential gear 14, forming part of a drive line of the motor vehicle, is mounted on a part of the vehicle (not shown) and has an input shaft with a forked head 18 for connection with a propeller shaft (not shown) forming part of the drive line from the vehicle engine (not shown) to the rear wheels of the vehicle. The differential gear 14 is connected through universally jointed half shafts 16 to stub axles 15 mounted for rotation in the hub supports 11. Each stub axle carries a brake drum 22 on which a wheel (not shown) is mounted. Each hub support 11 carries a brake backing plate 23.

The half shafts 16 are each connected through universal joints 19, 20 to the differential and stub axles respectively. The universal joint 20 adjacent the stub axle is shown in section. At its end adjacent the universal joint 20 the stub axle 15 has a hollow member 27 which is connected by screws 21 with a housing 25 for coupling elements 26. The housing and coupling elements are part of the universal joint 20. The coupling elements 26 are balls which are held by the housing in grooves on the end of the half shaft 16, which end projects into the housing 25 and forms the shaft member of the universal joint. A sheet metal retainer 24 is also secured to the housing by the screws 21. A resilient sealing boot 28 is provided to cover the joint 20 and protect it from damage, dirt, and loss of lubricant from the joint interior. The boot 28 is secured on the sheet metal retainer 24 and the shaft 16 by clamp rings 32 and 46, respectively.

FIG. 2 is a plan, to a larger scale, and in section of the resilient sealing boot 28. The boot 28 has an end portion 29 which is secured on the sheet metal retainer 24 by the clamp 32 disposed between annular beads 30, 31 on the end portion 29. The retainer 24 has an upturned end or bead 33 which engages behind a shoulder 34 of the end portion 29 to provide additional securement of the end portion against axial displacement.

A cylindrical connecting piece or web 35 joins the end portion to an annular diaphragm portion 36 forming part of a bellows portion of the boot. This diaphragm portion 36 is interconnected with an adjacent annular diaphragm portion 41 by a web 37. The annular diaphragm portion 36 has at its inner periphery an inwardly directed extension 38 lying substantially normal to the longitudinal axis of the boot, and which projects into the interior space 39 of the boot 28. The annular diaphragm portion 41 is connected by a web 43 to an annular diaphragm portion 42 in like manner to the connection between diaphragm portions 36 and 41, and annular diaphragm portion 43 is connected to an end portion 40 which is secured on the shaft 16 by a clamp 46. The end portion 40 is of smaller diameter than the end portion 29, and the diaphragm portions diminish in diameter from portion 36 to portion 43. The webs 37 and 43 are of generally frusto-conical form. The web 37 connects the inner periphery of diaphragm portion 36 with the outer periphery of diaphragm portion 41, whose inner periphery is in like manner connected with the outer periphery of diaphragm portion 43.

The diaphragm portion 42 extends normal to the longitudinal axis of the boot, but the portions 41 and 36 are inclined towards the large diameter end portion 29 at an angle not more than 10° from the normal of the longitudinal axis of the boot. An angle of 6° is preferred.

The end portion 40 has two annular beads 44, 45 adjacent its end and a clamp 46 is disposed between these to secure the boot on the shaft. The shaft 16 has two larger diameter portions 48, 49 between which the end portion 40 is held by the clamp 46, the larger diameter portion 48 abuts a shoulder 50 on the inner surface of the end portion 40. The resilient boot 28 is thus secured against axial displacement on the shaft, even when it is mounted under an initial longitudinal tension.

The extension 38 on the diaphragm portion 36 serves primarily to stiffen the bellows portion of the boot to withstand centrifugal force when the joint is rotated so that the bellows portion is not deformed and its useful life shortened. The use of only three diaphragm portions results in a boot of short length so that the stiffness imparted to the bellows portion by the extension 38 is not nullified by a long bellows portion.

The extension 38 also divides the interior 39 of the bellows portion of the boot into two interconnected chambers 51 and 52. The chamber 51, adjacent the housing 25 contains a design quantity of lubricant for the universal joint, and the other chamber 52 is kept free of this lubricant by the extension 38. Because of this division into two chambers the quantity of lubricant required for the joint can be reduced, and this is advantageous in reducing the deforming effect of the lubricant on the bellows portion, for when the vehicle is at rest the lubricant tends to gather at the lowermost part of the chamber 51, and in its cold state the lubricant is a thick and heavy mass, which upon rotation of the joint acts as an eccentrically disposed weight upon the bellows. Due to the subdivision of the bellows interior, deformation caused by the lubricant is limited to the portions 29, 35 and 36 on the joint housing side of the extension 38.

The bellows portion of the resilient boot as described above is so formed, that the inner edge of the extension 38 and the inner peripheries of the diaphragm portions 41, and 43 and their adjacent web portions lie on the surface of a cone whose apex angle, which lies beyond the lesser diameter end collar portion 40 of the resilient boot, is less than 20°. This construction prevents the extension 38 from being bent over during articulatory movement of the half shaft 16 relative to the joint housing 25, and also obviates damage to the bellows which might otherwise chafe against the half shaft.

An elastomeric heat-resistant plastics material is used in the resilient sealing boot, which has a uniform wall thickness, so that it is readily made in one piece by extrusion, dipping, pressing or moulding processes.

I claim:

1. A resilient integral sealing boot for use with a universal joint including a housing receiving one end of a shaft mounted for rotational movement about the longitudinal axis of the shaft and for angular movement about at least one transverse axis of the shaft adjacent the one end thereof, the integral sealing boot comprising, first and second annular end portions for sealing engagement respectively with the housing and the shaft, the first end portion having a larger diameter than the second end portion, an integral annular bellows between the end portions and including a plurality of spaced annular diaphragm portions disposed in planes generally normal to the longitudinal axis of the boot, the diaphragm portions having decreasing diameters from the first end portion toward the second end portion, a plurality of space annular web portions, each web portion integrally connecting the annular outer edge of a respective diaphragm portion to the annular inner edge of the adjacent diaphragm portion toward the first end portion, first and second connecting portions respectively integrally connecting the first and second end portions and the endmost diaphragm portions, and a planar integral annular extension of the endmost diaphragm portion adjacent the first end portion, the annular extension extending radially inwardly of the boot and being oriented in a plane generally normal to the axis of the boot, the annular extension being oriented in axially spaced relationship to the first end portion and cooperating with the first connecting portion and associated endmost diaphragm portion to define a lubricant receiving chamber, the annular extension cooperating with the bellows to define a second chamber and to rigidify the bellows during rotational movement of the boot.

References Cited
UNITED STATES PATENTS

| | | | |
|---|---|---|---|
| 2,227,687 | 1/1941 | Wolher | 64—32 |
| 2,672,740 | 3/1954 | Dunn | 64—32 |
| 2,857,975 | 10/1958 | Thorne | 64—8 |

FOREIGN PATENTS

| | | | |
|---|---|---|---|
| 1,347,809 | 10/1962 | France | 64—32 |

BENJAMIN W. WYCHE, Primary Examiner

R. HEALD, Assistant Examiner